United States Patent [19]

Lohmeijer

[11] Patent Number: 4,551,494
[45] Date of Patent: Nov. 5, 1985

[54] ANTISTATIC POLYPHENYLENE ETHER COMPOSITIONS

[75] Inventor: Johannes H. G. M. Lohmeijer, Hoogerheide, Netherlands

[73] Assignee: General Electric Company, Selkirk, N.Y.

[21] Appl. No.: 546,137

[22] Filed: Oct. 27, 1983

[30] Foreign Application Priority Data

Oct. 29, 1982 [NL] Netherlands .......................... 8204180

[51] Int. Cl.[4] ............................................. C08L 79/04
[52] U.S. Cl. .......................................... 524/89; 524/87; 524/155; 524/157; 524/158; 524/161; 524/166; 524/167; 524/173; 524/508; 524/540; 524/577; 524/611; 525/132; 525/390; 525/392; 528/212; 528/214; 528/217; 528/218
[58] Field of Search ................... 524/87, 89, 155, 157, 524/158, 161, 166, 167, 173, 508, 540, 577, 611; 525/132, 390, 392; 528/212, 214, 217, 218

[56] References Cited

U.S. PATENT DOCUMENTS

| | | | |
|---|---|---|---|
| 2,733,246 | 11/1955 | Boyd et al. | 524/166 |
| 3,592,879 | 7/1971 | Ott et al. | 524/157 |
| 4,123,475 | 10/1978 | Abolins et al. | 524/158 |
| 4,307,009 | 12/1981 | Luders et al. | 524/157 |
| 4,315,081 | 2/1982 | Kobayashi et al. | 524/166 |
| 4,380,598 | 4/1983 | Robenson et al. | 524/157 |

FOREIGN PATENT DOCUMENTS

| | | | |
|---|---|---|---|
| 0001362 | 1/1979 | Japan | 524/166 |
| 0037154 | 3/1979 | Japan | 524/166 |

*Primary Examiner*—Lester L. Lee

[57] ABSTRACT

A polymer mixture comprising (a) a base resin selected from the group consisting of polyphenylene ether resins and polyphenylene ether modified with alkenyl aromatic resins; and (b) an amount of antistatic agent effective for improving the antistatic character of said polymer mixture wherein said antistatic agent is a compound of the formula R—SO$_3$X, where R is an alkyl or aralkyl radical having 5 to 25 carbon atoms and X is an alkali metal.

5 Claims, No Drawings

ANTISTATIC POLYPHENYLENE ETHER COMPOSITIONS

This application claims priority from an application first filed in the Netherlands on Oct. 29, 1982, Ser. No. 8,204,180.

The invention relates to a polymer mixture which comprises a polyphenylene ether polymer, optionally a styrene polymer and an antistatic agent. Such a mixture is known from U.S. Pat. No. 4,123,475 and comprises a mixture of three components as an antistatic, namely triethanol amine, toluene sulphonic acid and sodium lauryl sulphate. It is stated in the Patent that each of the three components individually shows no or only slight antistatic activity.

The present invention provides the use of an antistatic which can be combined with one or more dyes which are capable of compensating for the usual discoloring of mixtures comprising polyphenylene ether polymers upon exposure to light. Only a few antistatics are compatible with such dyes. The polymer mixture according to the invention includes an antistatic compound of the formula $R-SO_3X$, wherein R is an alkyl radical or an aralkyl radical having 5–25 carbon atoms and X is an alkali metal.

The antistatic is preferably used in a quantity from 0.05 to 5% by weight; quantities smaller than 0.05% by weight produce too small an antistatic activity, whereas quantities above 5% by weight produce no further improvement of the antistatic properties.

Polymer mixtures which include an antistatic are often used for applications in which the static charge of polymer mixtures is undesirable, for example, for the manufacture of envelopes for electronic apparatus.

The polymer mixture according to the invention comprises a polyphenylene ether polymer. Such polymers and their preparation are described in numerous patent publications, for example, the U.S. Pat. Nos. 3,306,874; 3,306,875; 3,257,357 and 3,257,358. The polymer mixture according to the invention may also include a styrene polymer. The use of styrene polymers in such mixtures is described more particularly in the U.S. Pat. Nos. 3,383,435 and 3,663,661. All the foregoing U.S. Patents are hereby incorporated by reference. The polyphenylene ether polymers preferably have the following formula:

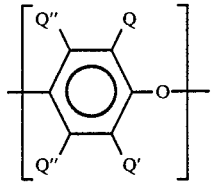

wherein Q is a monovalent substituent, for example, a hydrogen atom, a hydrocarbon radical, a hydrohalogenic radical having at least two carbon atoms between the halogen atom and the phenyl nucleus, an alkoxy radical or a halogen alkoxy radical having at least two carbon atoms between the halogen atom and the phenyl nucleus, Q' and Q" may be the same as Q or in addition represent a halogen atom, wherein Q, Q' and Q" may not comprise a tertiary alpha carbon atom and wherein n is an integer of 50 or more. In addition to a polyphenylene ether polymer the polymer mixture according to the invention preferably also comprises a styrene polymer. The styrene polymer may be mixed physically with the polyphenylene ether polymer. The polymer mixture may also comprise a graft-copolymer product, for example, as may be formed upon co-extrusion of the polyphenylene ether polymer and the styrene polymer at elevated temperature (e.g. 230°–320° C.).

The styrene polymer, if utilized, is preferably a polymer of which at least 25% by weight of the units of the polymer may consist of a vinylaromatic compounds of the formula:

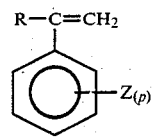

wherein R is a hydrogen atom, a lower alkyl group (having, for example 1–6 carbon atoms) or a halogen atom; Z is a vinyl group, a hydrogen atom, a chlorine atom or a lower alkyl group and p=0 or an integer from 1–5. The expression "styrene polymer" as defined above and as used in the claims of the present patent application therefore includes, by way of example, homopolymers, for example, polystyrene and polychlorostyrene and polybromostyrene, rubber-modified polystyrene, for example, the commercially available high-impact polystyrene polymers and also the styrene-comprising copolymers, for example, styrene-acrylonitrile copolymers (SAN), styrene butadiene copolymers, styrene acrylonitrile butadiene terpolymers (ABS), poly-α-methyl styrene, copolymers of ethylvinyl benzene and divinylbenzene and the like. Styrene homopolymers and rubber-modified high-impact polystyrene are preferred.

The styrene polymer may be present in any feasible quantity. Weight ratios of the polyphenylene ether polymer to styrene polymer varying between 1:99 and 99:1 are used. The weight ratio is preferably chosen between 1:5 and 5:1, and even more preferably a weight ratio of approximately 1:1 is used.

The compositions of the present invention also can include one or more selected dyes which discolor upon being exposed to light in a fashion which offsets the normal discoloration of the polymers.

The antistatics as used in the polymer mixture according to the invention must be compatible with the selected dyes and include certain commercially available antistatics. The remaining antistatics may be prepared according to general methods of organic synthesis. Particularly suitable antistatics are compounds of the formula $C_{12-20}H_{25-41}SO_3Na$ and $C_{12}H_{25}-C_6H_4-SO_3Na$.

The British Pat. No. 1,078,365 describes the addition of alkylsulfonates to styrenic resins for rendering them antistatic properties. The styrenics thus obtained are to be processed at temperatures of 160°–270° C. It could not be foreseen that the known sulfonates could be successfully in corporated in polymer mixtures which should be processed at temperatures of 280°–320° C. as is the case for the polymeric mixtures according to the invention.

The polymer mixture according to the invention may include one or more dyes which compensate for the change in color of the polyphenylene ether polymer upon exposure to light in that said dyes bleach upon being exposed to light. Suitable dyes are yellow quinophtalone dyes, purple anthrapyridone dyes and preferably mixtures of a yellow quinophtalone dye and a purple anthrapyridone dye. These dyes, as well as their use in polyphenylene ether resins, are more fully described in copending application Ser. No. 546,136, now U.S. Pat. No. 4,493,915 filed concurrently herewith and incorporated herein by reference. It has been found that the above-mentioned antistatics as used in the polymer mixture according to the invention do not influence the activity of the above-mentioned dyes, in other words, no disturbing interaction occurs between the antistatics and the dyes. Other known antistatics do show such a disturbing interaction or are thermally unstable for being processed in mixtures comprising polyphenylene ether polymer. These mixtures are usually processed at temperatures from 280° to 320° C.

In the examples below, the antistatic behavior has been determined as follows: the sheet resistance is measured in 10 cm circular disks which had been stored in an atmosphere having a relative humidity of 50% for 24 hours. A sheet resistance of approximately $10^{10}$ to $10^{12}$ Ohm generally is a sufficiently low value to prevent the building up of static charges. It was also evaluated visually whether the samples, after three days in the working space (placed vertically on a rack), had a layer of dust.

In some examples the thermal stability of the polymer mixture was examined by measurement of the discoloring after injection molding at 320° C. (with a residence time of 10 minutes at 320° C.). The changes in color are expressed in a number (delta $E_{ab}*$) according to CIE-LAB (DIN No. 6174).

The invention will be described with reference to the following examples.

EXAMPLE I

A polymer mixture was prepared by dry-mixing the following constituents:

| Constituent | Parts by weight |
| --- | --- |
| Poly (2,6-dimethyl-1,4-polyphenylene ether) | 50 |
| Rubber-modified high-impact polystyrene (Styron XP 5554.02, of Dow Chemical) | 50 |
| Aromatic phosphite stabilizer | 0.5 |
| Zinc sulphide | 0.15 |
| Zinc oxide | 0.15 |
| Antistatic, $C_{12-20}H_{25-41}SO_3Na$ (Hostastat HSI, of Hoechst) | 3.0 |

A mixture was also prepared without an antistatic.

The mixtures obtained were passed through an extruder at approximately 300° C. The pelletisized extrudate was processed by injection molding at a melting temperature of approximately 290° C. The resulting articles were tested for their antistatic properties and a few other physical properties. The sheet resistance of a test plate manufactured from the polymer mixture with antistatic was $10^{10}$ Ohm, the polymer mixture without an antistatic: $10^{16}$ Ohm. The test plate with an antistatic did not attract dust. The glass transition temperature, the notch impact strength (according to Izod), the melt viscosity and the tensile strength were not adversely influenced by the addition of the antistatic. The delta $E_{ab}*$ value of the polymer mixture according to this example after extrusion was 0.5 (i.e. substantially no discoloring).

EXAMPLE II

Two colored polymer mixtures were prepared. One in accordance with the invention with $C_{12-20}H_{25-41}SO_3Na$ as an antistatic (Example II), one for comparison with a known antistatic: $C_8H_{17}(CH_3)(CH_2CH_2OH)_2$—N+. $CH_3$—$C_6H_4$—$SO_3$ (A). Both polymer mixtures included a yellow quinophtalone dye; Solvent Yellow 138 (Paliotol Yellow 1090 of BASF). Both polymer mixtures were antistatic. However, mixture A had strongly discolored during a residence time of 1–5 minutes at 250°–300° C. during injection molding. The delta $E_{ab}*$ values varied from 8.5–16. The mixture according to the invention (Example II) on the contrary did not discolor or discolored only to a slight extent during residence times of up to 12 minutes at 290°–310° C. (delta $E_{ab}*$ value: 0.3–0.8). The considerable discoloring in Mixture A indicates that the antistatic used therein has an adverse influence on the dye. The antistatic according to the invention in Example II has hardly any influence on the dye. The dye as indicated in this example is one of the few dyes which are suitable to compensate for the yellowing of a polyphenylene ether polymer upon exposure to light.

| Constituent | Mixture (parts by weight) (A) | (II) |
| --- | --- | --- |
| Poly (2,6-dimethyl-1,4-phenylene ether) | 45 | 40 |
| Rubber-modified high-impact polystyrene* | 55 | 60 |
| Aromatic phosphite stabilizer | 0.5 | 0.5 |
| Zinc oxide | 0.15 | 0.15 |
| Zinc sulphide | 0.15 | 0.15 |
| Cumyldiphenyl phosphate | 5.0 | 10.0 |
| Antistatic | 3.0 | — |
| $C_8H_{17}(CH_3)$—$(CH_2CH_2OH_2)_2$—N.$CH_3$—$C_6H_4$—$SO_3$ | 3.0 | — |
| $C_{12-20}H_{25-41}SO_3Na$ | — | 2.0 |
| Dye: pigment yellow 138 | 0.05 | 0.05 |
| (*Styron XP 5554.02 Dow) | | |

EXAMPLE III

Two polymer mixtures were prepared: Example III with an antistatic according to the invention and mixture B with another antistatic. Examples III and B both included a dye (Pigment Yellow 138).

| Constituent | Mixture (parts by weight) (B) | (III) |
| --- | --- | --- |
| Poly (2,6-dimethyl-1,4-polyphenylene ether) | 40 | 40 |
| Rubber-modified high-impact polystyrene (Styron XP 5554.02 Dow) | 60 | 60 |
| Triphenylphosphate | 10 | 10 |
| Zinc oxide | 0.15 | 0.15 |
| Zinc sulphide | 0.15 | 0.15 |
| Aromatic phosphite | 0.5 | 0.5 |
| Sodium dodecyl-phenylsulphonate | — | 3 |
| Methyl-octyl-bis (2 hydroxyethyl) ammonium paratoluenesulphonate (as also used in mixture A) | 0.05 | 0.05 |
| Pigment Yellow 138 | 0.05 | 0.05 |

Test plates manufactured from Example III according to the invention had a sheet resistance of $10^{12}$ Ohm, i.e. sufficiently low so as not to attract dust; plates from mixture B had sheet resistance of $10^{10}$ Ohm. After prolonged heating in an injection molding apparatus, the delta $E_{ab}*$ value for Example III was: 0.7 and for mixture B: 6.9. This indicates that the dye (Pigment Yellow 138) is attacked by the ammonium compound (a known antistatic) at elevated temperature and is not attacked by the dodecyl-phenyl-sulphonate.

I claim:

1. A polymer mixture consisting essentially of:
   (a) a base resin selected from the group consisting of polyphenylene ether resins and polyphenylene ether resins modified with alkenyl aromatic resins; and
   (b) an amount of antistatic agent effective for improving the antistatic character of said polymer mixture wherein said antistatic agent is a compound of the formula $R-SO_3X$, where R is an alkyl or aralkyl radical having 5 to 25 carbon atoms and X is an alkali metal; and
   (c) an amount of a dye effective for compensating for a discoloration of said polymer mixture upon exposure to light wherein said dye bleaches upon exposure to light.

2. A polymer mixture as in claim 1 wherein said antistatic agent is present in an amount of from 0.05 to 5.0% by weight of the polymer mixture.

3. A polymer as in claim 1 wherein said antistatic of the formula $R-SO_3X$ includes a mixture of alkyl groups having 12 to 20 carbon atoms and X is a sodium ion.

4. A polymer mixture as in claim 1 wherein said dye is selected from the group consisting of yellow quinophtalone dye, purple anthrapyridone dye, and mixtures of these.

5. An article formed from the polymer mixture of claim 1.

* * * * *